Nov. 16, 1954  H. N. SEYFERTH  2,694,414
HYDRAULIC COOLANT SYSTEM AND CONTROL
VALVE MECHANISM THEREFOR
Filed March 23, 1951                                        3 Sheets-Sheet 1
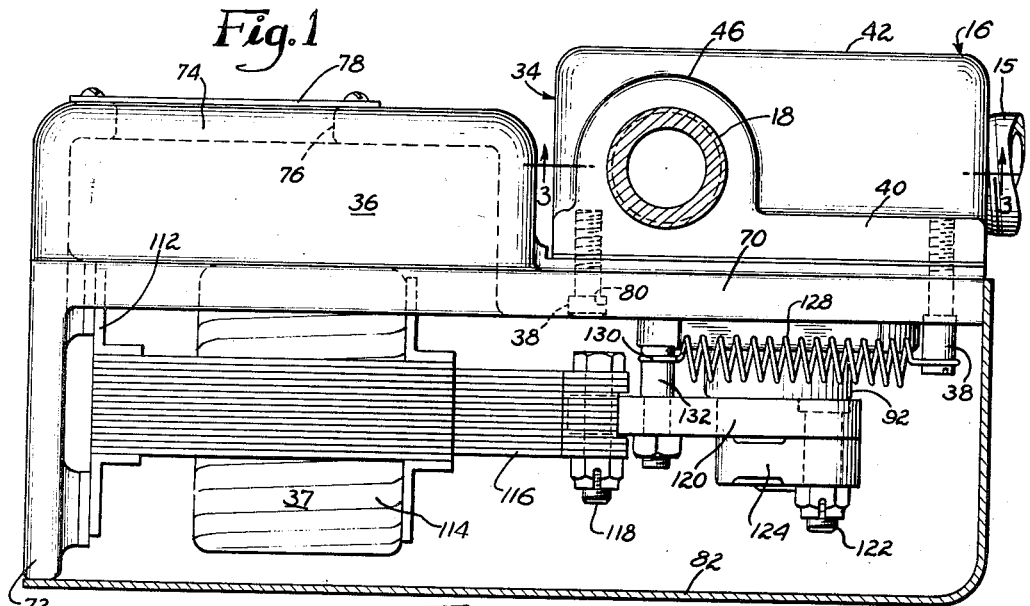
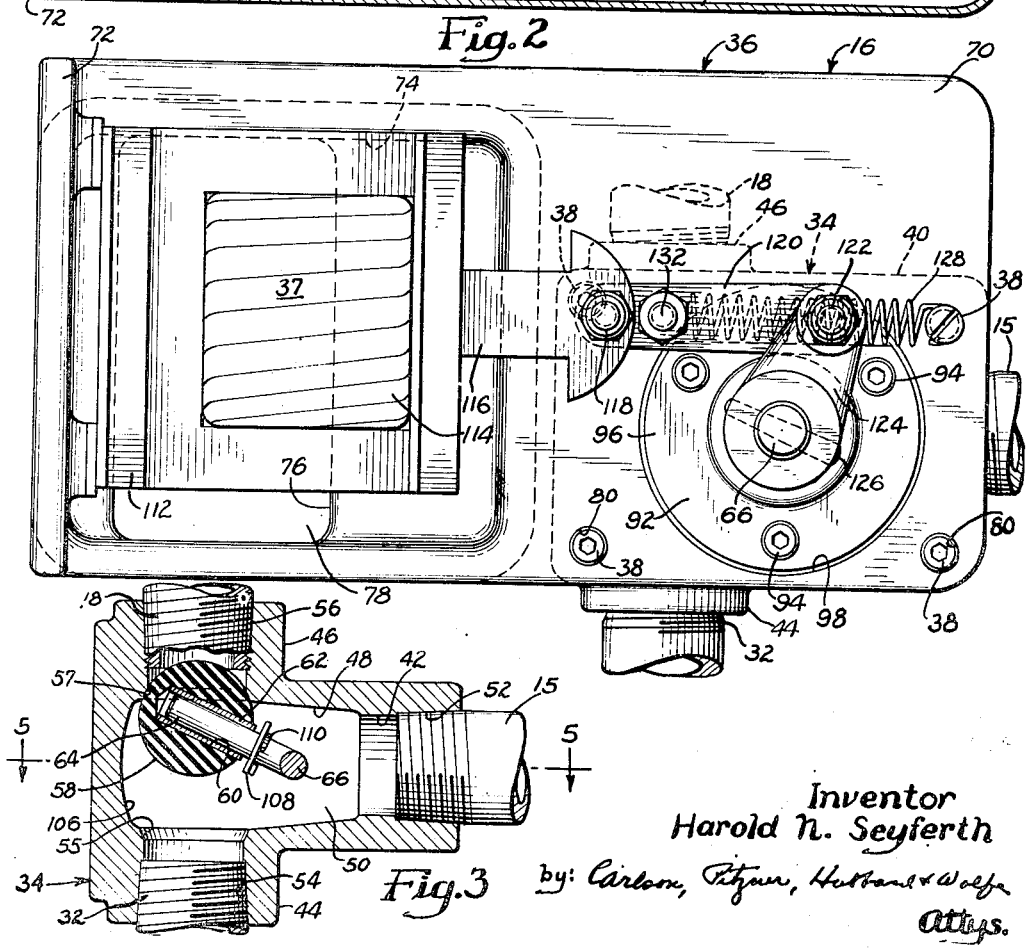
Inventor
Harold N. Seyferth

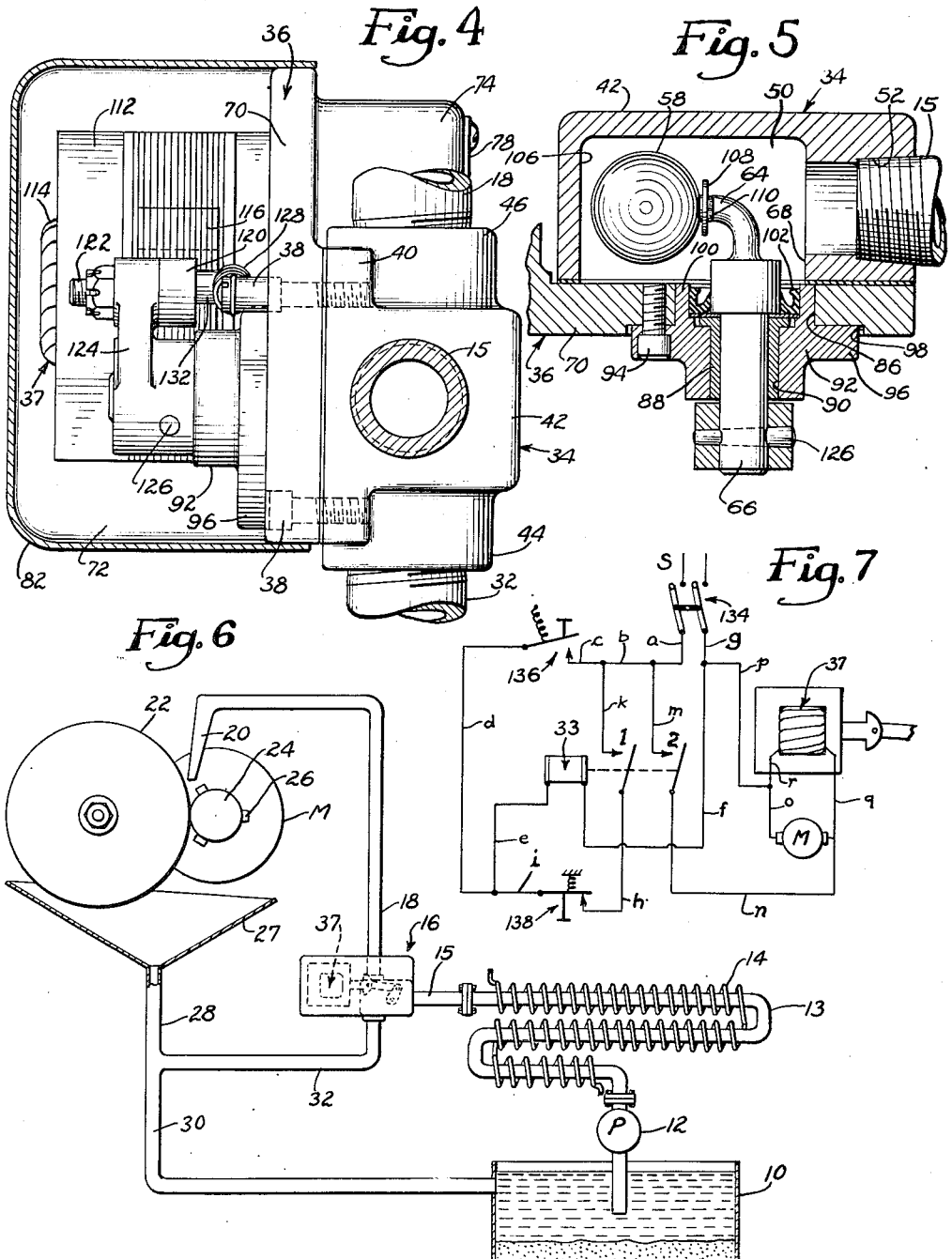

INVENTOR.
Harold N. Seyferth

United States Patent Office 2,694,414
Patented Nov. 16, 1954

2,694,414

HYDRAULIC COOLANT SYSTEM AND CONTROL VALVE MECHANISM THEREFOR

Harold N. Seyferth, East Detroit, Mich., assignor to Ex-Cell-O Corporation, Detroit, Mich., a corporation of Michigan Application March 23, 1951, Serial No. 217,271

1 Claim. (Cl. 137—625.44)

The present invention relates to coolant systems for controlling the flow of fluid coolant from a coolant tank to the operating tool of a grinding machine and its associated workpiece, and to an electrically operated control valve for such systems.

The improved valve construction comprising the present invention is primarily adapted for use in connection with coolant systems wherein mechanical mixtures of oil or water containing a high percentage of abrasive sediment are selectively directed through conduits provided for them. The invention is, however, capable of other uses and the valve construction may be employed, with or without modification, in a wide variety of applications as a directional valve for effecting a direction-change in the flow of a fluid whatever be its nature and for whatever purposes it may be intended.

In coolant systems of the type characteristically employed in connection with thread and other grinding machines for laving the tool and the workpiece, the coolant employed accumulates, in suspension, a fairly large collection of highly abrasive particles which are dislodged from the grinding tool, as well as metallic cuttings severed from the workpiece. Some of these particles may settle out of the coolant tank but a large percentage of them are, by virtue of their specific gravity and small size, either non-settleable or of such slow settling character that they find their way back to the coolant pump from the coolant tank before they have had an opportunity to settle out. Valves of conventional construction are incapable of controlling the flow of such fluid coolants over any extended period of time for the reason that sediment will accumulate on the metallic or other sealing surfaces of the valve and prevent effective closing of the valve passages. Furthermore, in certain types of valve constructions, the sediment will penetrate the interstices existing in and around the screw threads or other mechanical means employed for moving the valve element with respect to its seating surface, thus resulting in destructive wear and earlier failure of the valve by preventing movement between members which otherwise should be relatively movable.

The present invention is designed to overcome the above noted limitations that are attendant upon the use of conventional valve constructions employed for controlling the flow of fluid coolant in a coolant system, and toward this end it contemplates the provision of a directional valve construction including a corrosion proof, wear resisting valve member proper which is self-seating and self-sealing with respect to the valve seats with which it is associated, and also including valve seats which, in themselves, present no appreciable seating surface on which the sedimentary material may collect.

The provision of a valve construction of the type briefly outlined above being one of the principal objects of the invention, another object is to provide such a valve assembly in which the operating instrumentalities for moving the valve member are effectively sealed against the influx of destructive sedimentary material.

It is a further object of the present invention to provide a valve construction of this character in which the specific shape of the valve member proper and of its cooperating seating surfaces is so designed that the fluid passages defined by the valve member and its seating surfaces are self-cleaning under the influence of fluid flow through the valve mechanism.

Another object of the invention, in a modified form thereof, is to provide a valve construction of the character set forth above in which the valve element proper is readily accessible for the purpose of inspection, repair, or replacement without disturbing any of the operating instrumentalities therefor.

A further object of the invention is to provide a coolant system which will operate to deliver coolant fluid from the coolant tank usually associated with such systems to the operating tool of the grinding machine when the grinding machine is in actual operation and performing useful work, and which will prevent delivery of the fluid to the grinding machine and workpiece when the machine is idle during such periods of idle time as may arise in connection with the normal day-by-day operation of the machine, such as during loading or unloading of parts or during the making of necessary adjustments.

Another and related object of the invention is to provide a coolant system of this character in which the fluid coolant is maintained in circulation in the coolant system when the grinding machine is idle for any of the reasons outlined above in order that the refrigeration system, ordinarily employed for absorbing heat by a heat transfer operation from the coolant fluid, will not cause congealing or freezing of the fluid prior to resumption of operation of the machine.

The provision of a valve construction of the character set forth above which is extremely simple in its construction; one which is rugged and durable and efficient in its operation; one which is comprised of a minimum number of moving parts and which consequently is unlikely to get out of order; one which may be manufactured at a low cost, and one which otherwise is well adapted to perform the services required of it, are further desirable features which have been borne in mind in the production and development of the present invention.

In the accompanying three sheets of drawings forming a part of this specification, one embodiment of the invention has, for illustrative purposes, been disclosed.

In these drawings:

Figure 1 is a side elevational view of an electrically controlled valve assembly constructed in accordance with the principles of the present invention. In this view certain portions of the valve casing have been cut away to more clearly reveal the nature of the invention.

Fig. 2 is a side elevational view of the structure shown in Fig. 1.

Fig. 3 is a sectional view taken substantially along the line 3—3 of Fig. 1.

Fig. 4 is an end elevational view of the structure shown in Fig. 2.

Fig. 5 is a sectional view taken substantially along the line 5—5 of Fig. 3.

Fig. 6 is a schematic view of a coolant system showing the improved valve structure of the present invention incorporated therein.

Fig. 7 is an electrical diagram of the control circuit employed for operating the valve of Fig. 6.

Figure 8:
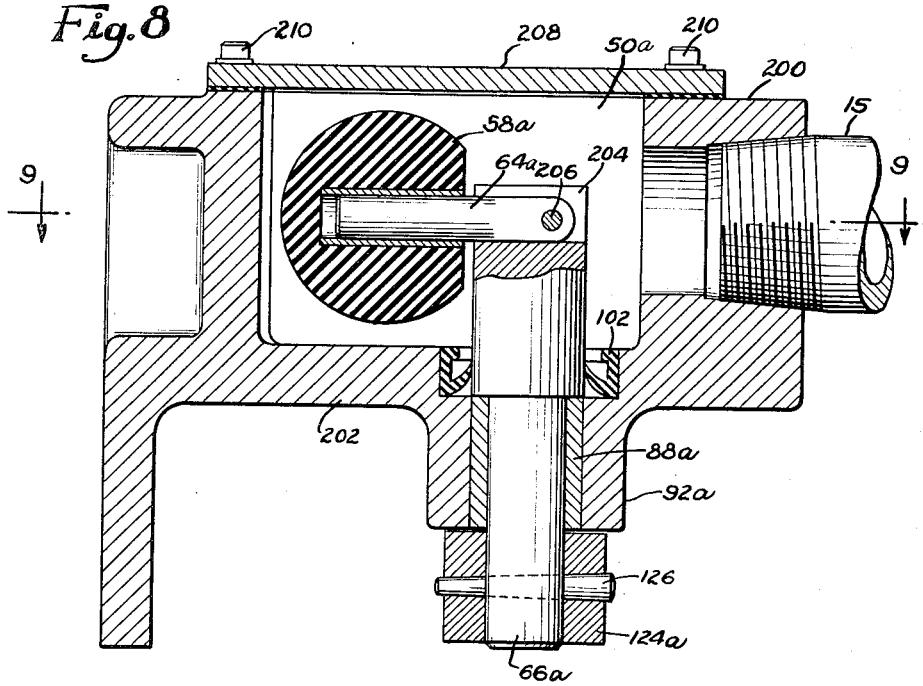
Fig. 8 is a sectional view similar to Fig. 5 showing a modified form of valve construction.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring now to the drawings in detail and in particular to Fig. 6, the improved valve construction is shown as being applied to a coolant system for directing coolant fluid, which may be oil, to a grinding wheel and workpiece for purposes of temperature control as well as to carry away the products of the grinding operation. The disclosure of the system is entirely schematic in its representation.

The source of coolant fluid or oil is contained in a coolant receptacle or tank 10 from whence it may be withdrawn by means of a coolant pump 12 of conventional design and conducted to a heat exchange device 13 including refrigeration coils 14 and which likewise is of conventional design. The device 14 is employed for the purpose of removing excess heat from the coolant before the latter is directed to the grinding wheel and workpiece.

From the heat exchange device 13, the coolant is conducted through a conduit 15 to the valve construction of the present invention and which has been designated in its entirety at 16 from whence it may be directed through a conduit 18 to a coolant delivery nozzle 20 for application to an operating tool which may be in the form of a grinding wheel 22 and to a workpiece 24 which may be suitably carried in a work head 26 driven by an electric motor M (see also Fig. 7). When so directed, the coolant liquid, after contact with the grinding wheel and workpiece in heat exchange relationship, together with the products of abrasion, may fall into a collector hopper or funnel 27 and from thence be returned by gravity flow through conduit sections 28 and 30 to the coolant tank 10. During idle periods of the grinding machine, it is advisable to maintain the coolant pump 12 in continuous operation in order that the cooling effect of the refrigeration system may continuously be applied to the control of temperature of the coolant in the coolant tank 10. Such continuous operation of the pump 12 is also desirable in order to prevent congealing or freezing of the coolant in the immediate vicinity of the heat exchange device 13 which would otherwise occur if the flow of coolant in the circulatory system were discontinued for any extended period of time. In order to thus discontinue the supply of coolant to the grinding tool and workpiece, while at the same time maintaining the flow of coolant through the pump 12 and heat exchanging device 13, the valve 16 may be operated to direct coolant from the heat exchange device 13 through conduit sections 32 and 30 to the coolant tank 10, thus by-passing the grinding station provided by the grinding tool and workpiece.

The valve structure whereby coolant may be selectively directed from the heat exchange device 13 to the grinding wheel and workpiece 22, 24 or returned directly from the heat exchange device 13 to the coolant tank 10, is operable under the control of a solenoid 37 (Fig. 7) which is disposed in an electrical circuit, the nature of which will be set forth presently.

Referring now to Figs. 1 to 5, inclusive, the valve assembly 16 involves in its general organization a two-part, separable assembly which may be comprised of two castings, one casting constituting a valve housing 34 for the valve 16 and the other casting constituting a solenoid housing 36 for the control solenoid 37 associated with the valve 16, the two housings being capable of assembly, one upon the other, by means of securing studs 38.

The valve housing 34 includes a generally rectangular base portion 40 from which there extends upwardly a block portion 42 of rectilinear design and which is provided adjacent one end thereof with a pair of alined laterally extending boss-like portions 44 and 46. The block portion 42 of the casting 34 is provided with a longitudinally extending central bore 48 providing an internal valve chamber 50 having a fluid inlet 52 at one end thereof which is internally threaded for reception therein of one end of a conduit which, according to the particular installation shown in Fig. 6, may be the conduit 15 leading from the heat exchange device 13. The chamber 50 is provided with a fluid outlet 54 or port having an annular tapered valve seat 55 and extending through the boss 44. The outlet 54 is adapted for communication with the conduit 32 which is connected to the conduit 30 and by means of which conduits 32 and 30 the coolant fluid may be conducted from the heat-exchange device 13 to the coolant tank 10. The valve chamber 50 is provided with a second fluid outlet or port 56 extending through the boss 46 and provided with an annular tapered valve seat 57. The outlet 56 is designed for connection to the conduit 18 leading to the nozzle 20 in the vicinity of the grinding wheel 22.

Fluid entering the chamber 50 through the fluid inlet 52 is adapted to be selectively directed to the outlet ports 54 and 56 by means of a valve element 58 which is common to both fluid outlets and which is capable of effectively blocking either of the fluid outlets in a manner and by a mechanism which will be set forth presently.

The studs 38 by means of which the two castings 34 and 36 are connected together are adapted to pass through one wall of the casting 36, as shown in Figs. 1 and 2, and are threadedly received in the base portion 40 of the valve casting 34.

The valve element 58 is in the form of a generally spherical body which is preferably constructed of a plastic material such as neoprene or a similar resinous material which is resistant to deterioration in the presence of oil and which is relatively soft or yielding and which possesses a material degree of resiliency. The valve member 58 is formed with a diametrically extending bore 60 within which there is secured, preferably by a vulcanizing process, a cylindrical bushing 62 into which there extends loosely an operating finger 64. The operating finger 64 is in the form of a laterally turned, reduced end provided on an operating shaft 66 (Fig. 5) which projects through an opening 68 formed in the base portion 40 of the casting 34 and which also projects through a portion of the casting or solenoid housing 36 as will be described presently.

The solenoid housing 36 includes a flat, generally rectangular base portion 70 having a laterally turned flange or wall 72 (Fig. 1) at one end thereof. The base portion 70 is provided with a well portion 74 which is provided for clearance purposes as will be set forth subsequently and which is provided with an opening 76 therein adapted to be closed by means of a cover plate 78. The opening 76 is provided for the purpose of permitting access to or inspection of the interior of the housing 36.

The well portion 74 is contiguous with the laterally turned flange or wall 72 and it extends forwardly of the base portion 70 a substantial distance and is discontinued in the medial regions of the base portion. The valve housing 34 is adapted to be secured to the side of the base portion 70 of the solenoid housing 36 which is opposite the well portion 74 and which is on the same side of the base as the laterally turned flange or wall 72 and accordingly, a series of threaded openings 80 are provided in the base portion 70 for the purpose of receiving the studs 38. A removable cover plate 82 serves, in combination with the base portion 70, well portion 74 and laterally turned flange 72, to enclose the solenoid 37 and its operating instrumentalities. An opening 86 (Fig. 2) is provided in the base portion 70 and is adapted to register with the opening 68 so that the operating shaft 66 may pass therethrough and extend into the interior of the solenoid housing assembly.

The shaft 66 is rotatably journaled in a bushing 88 disposed within the central bore 90 of a sleeve member 92 which is secured by means of screws 94 to the base portion 70 of the casting 34. The sleeve member 92 is provided with a lateral flange 96 which seats within a shallow recess 98 provided in the face of the base portion 70 and has an annular portion 100 extending into the opening 86. An oil seal designated in its entirety at 102 is provided within the annular portion 100 for the purpose of preventing penetration of oil into the bearing space surrounding the operating shaft 66 and for preventing creepage of sedimentary material into this space. The operating shaft 66 is oscillatably journalled in the bushing 88 through which it extends and it is also capable of limited axial sliding movement within the bushing in either direction, such movement being a free movement in order to permit the resilient body or member 58 to effectively become sealed on either of the tapered valve seats 55, 57 provided within the chamber 50.

Referring now to Figs. 3 and 5, the laterally turned, reduced end or operating finger 64 of the operating shaft 66 projects loosely into the bushing 62 which is embedded by a vulcanization process in the spherical valve member 58 and the valve member is confined between the inner surface of an end wall 106 of the chamber 50 and a washer 108 which is loosely seated on the operating finger 64 and which is limited in its sliding movement therealong by means of a cotter pin 110 which passes through the finger 64. The valve body 58 may thus be said to be floatingly mounted on the finger 64 within the chamber 50 and the extent and angular position of the finger 64 on the operating shaft 66 is such that, upon turning movement of the shaft 66 in the bushing 88, the valve body 58 may be swung, so to speak, from a position wherein it seats upon the valve seat 55 to a position where it seats upon the valve seat 57, and vice versa.

It is to be particularly noted in connection with Fig. 3 that the spherical valve body 58 is possessed of a considerable degree of free movement on the end of the operating finger 64. In the first place, it is rotatable on the finger, and secondly it is axially slidable on the finger. Thirdly, the finger itself is capable of limited lateral movement as the operating shaft 66 moves axially in either direction. Thus, when the operating shaft 66 is turned in a clockwise direction as viewed in Fig. 3 to move the valve body 58 toward the valve seat 57, the resilient valve body 58, upon approaching and engaging the valve seat 57, will center itself accurately upon the valve seat under the influence of pressure applied thereto by the shaft 66 and also under the influence of hydraulic fluid pressure which may be built up within the valve chamber 50.

Similarly, when the shaft 66 is rotated in a counterclockwise direction, as viewed in Fig. 3, the resilient valve body 58 will become seated upon the valve seat 55 to effect a fluid tight seal against egress of the coolant through the outlet opening 54. Since the valve body 58 is thus possessed of such a degree of floating movement within the chamber 50, the same will rarely become seated on either valve seat 55 or 57 in substantially the same position of orientation. Yet each time it becomes seated it will produce an effective seal. The valve member 58 is thus, at least in part, self-seating and self-cleaning and there will be little tendency for suspended particles of abrasive or other material carried in suspension on the coolant to become lodged on either the valve body or on its two valve seats.

Referring now to Figs. 1, 2 and 4, the solenoid 37 which may be of conventional design is suitably supported from the wall portion 72 of the casting 36 on a bracket 112. The solenoid 37 includes a coil 114 having a movable armature 116 which is telescopically received within the coil 114. The outer end of the armature 116 has pivoted thereto, by means of a through-bolt assembly 118, one end of a connecting rod 120. The other end of the rod is pivoted by a similar through-bolt assembly 122 to the free end of a crank arm 124, the other end of which is mounted by means of a taper pin 126 on the operating shaft 66.

A coil spring 128 has one end thereof secured (Fig. 1) to a post 132 mounted on the connecting rod 120 and the other end of the coil spring is secured to one of the studs 38 by means of which the two castings 34 and 36 are secured together. The spring 128, acting upon the connecting rod 120, thus serves to normally maintain the armature 116 of the control solenoid 37 in an extended position with the operating shaft 66 so disposed that the spherical valve member 58 is seated on the valve seat 55, thus closing the outlet port 54 and allowing the port to remain open so that coolant fluid entering the valve through the conduit 15 and inlet port 52 will pass through the outlet port 56 and conduit 18 to the nozzle 20 for application to the grinding wheel 22 and workpiece 24. Upon energization of the solenoid 37, the armature 116 will be retracted against the influence of the spring 128 and the arm 124 will be swung in a counterclockwise position, as viewed in Fig. 2, to rotate the operating shaft 66 and swing the valve member 58 through an arcuate path and cause the same to become seated upon the valve seat 57 thus closing the outlet port 56 and opening the outlet port 54 so that coolant fluid entering the valve from the conduit 15 and inlet port 52 will pass through the outlet port 54 and conduits 32, 30 for return to the coolant tank 10, thus by-passing the discharge nozzle 20.

Because of the floating action of the spherical valve member 58, which is loosely mounted on the laterally turned end or operating finger 64 on the operating shaft 66, and because of the fact that the shaft 66 is axially slidably in the bushing 88, the valve member 58, in either of its extreme positions, may readily seek and find an effective seal on either of the valve seats 55 or 57, as the case may be. Since the spherical valve member 58 is capable of turning movement on the laterally turned end or finger 64 of the operating shaft 66, as well as being capable of limited axial sliding movement thereon, and since the inner wall surface 106 of the valve chamber 50 is generally rounded and of cup-shaped size, this latter surface will serve as a guide for the valve member when the laterally turned end or finger 64 is being swung in either direction. In any event, the valve member 58 will be guided into its final seating position on either side of the valve chamber 50.

The electrical circuit by means of which the solenoid 37 is controlled when the valve 16 is utilized in the coolant system of Fig. 6 is shown in Fig. 7. Current is supplied from a suitable source S which may be the usual electric power line through a master switch 134 and immediately upon closure of the master switch, current will be supplied to the electrical system to prepare the same for subsequent operation, but no electrical functions will take place until such time as the master starting switch 136 is closed.

Upon closure of the master switch 134, current will be supplied from one side of the power line S through the master switch 134, wires a, b, c, starting switch 136, wires d, e, relay magnet 33, wires f, g, and master switch 134 to the other side of the line, thus energizing the magnet 33. Upon energization of the magnet 33, a holding circuit for the magnet will be established. This circuit exists from one side of the power line S trrough the master switch 134, wires a, b, k, "1" contacts of the magnet 33 (now closed), wire h, stop switch 138, wires i, e, magnet 33, wires f, g, and master switch 134 to the other side of the line. Closure of the "2" contacts of the magnet 33 will establish a circuit through the motor M and control solenoid 37 of the valve 16. This circuit exists from one side of the power line S through the master switch 134, wires a, m, "2" contacts of the switch 138, wire n, motor M wires o, p, g and master switch 134 to the other side of the line. Simultaneously with the establishing of the motor circuit, a circuit through the control solenoid 37, which is arranged in electrical parallel with the motor M, will be established. This circuit leads from the source S through the master switch 134, wires a, m, "2" contacts of the magnet 33, wires n, q, solenoid 37, wires r, p, g, and master switch to the other side of the line. The stop switch 138 is interposed in the holding circuit for the magnet 33 and upon opening thereof, the holding circuit passing through the "1" contacts of the magnet 33 will be broken, thus opening both the "1" and "2" contacts of the magnet 33 to de-energize the motor M and valve control solenoid 37. From the above description, it will be seen that whenever the motor M is energized so as to operate the grinding machine, the solenoid 37 will become energized and fluid will be directed to the discharge nozzle 20 for application to the grinding wheel 22 and workpiece 24 from whence it will be collected in the collector hopper or funnel 27 and returned through the fluid lines or conduits 28 and 30 to the coolant tank 10. Whenever the grinding machine is not in operation, as evidenced by de-energization of the motor M, the solenoid 37 will also be de-energized and the valve element 58 will become seated on the valve seat 57 under the influence of the spring 128 so that fluid will be directed from the heat exchange device 13 through the fluid lines 32 and 30, thus by-passing the discharge nozzle 20.

Figure 9:
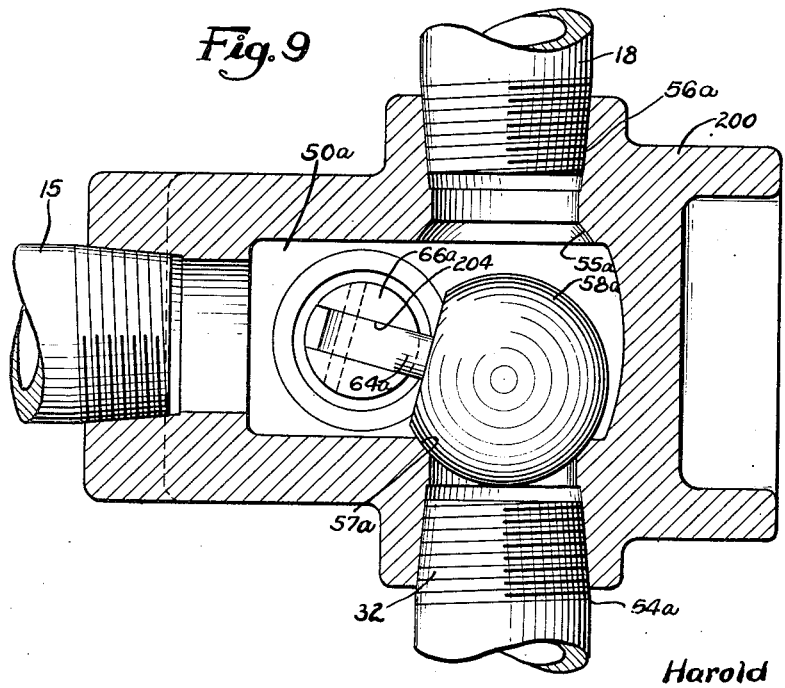
Fig. 9 is a sectional view taken substantially along the line 9—9 of Fig. 8.

In Figs. 8 and 9 a slightly modified form of the invention has been illustrated. In this form of the valve construction, the valve housing and the solenoid housing have been integrally formed as a single casting and the floating valve assembly per se, including the valve proper and its operating finger, has been mounted within the casting in the vicinity of a removable cover plate in order that it may be conveniently accessible for the purpose of replacement or repair. Additionally, the mode of attachment of the valve assembly proper to the operating shaft therefor has obviated the necessity of giving the operating shaft for the valve a degree of end play since the floating valve is readily capable of seeking an effective seat on either of the fluid outlets without such end play of the operating shaft.

In order to avoid needless repetition of description, similar characters of reference followed by a small letter "a" have been applied to the structural elements of the form of the valve construction of Figs. 8 and 9, which elements correspond to related structural elements of the form previously described and illustrated in Fig. 5 of the drawings.

In the form of the valve construction shown in Figs. 8 and 9, the main casting 200 is provided with a partition wall 202 which separates the valve chamber 50a from the chamber which encloses the solenoid and its operating instrumentalities such as the crank arm 124a by means of which motion is transmitted to the operating shaft 66a. The bushing 88a for the shaft 66a is disposed within a sleeve 92a integrally formed with the casting 200 and the mounting for the shaft and bushing is such that little, if any, end play of the shaft 66a is provided for. The inner end of the shaft 66a is bifurcated as at 204 and the operating finger 64a of the valve element 58a has its projecting end pivoted by means of a pin 206 between the furcations of the shaft 66. The operating pin 64a is thus free to swing about the axis of the pivot pin 206 and therefore the valve element 58a is free to seek its seat on either of the conical surfaces 55a or 57a of the fluid outlets 54a or 56a, respectively, as the case may be. The valve chamber 50a is adapted to be closed by means of a removable cover plate 208 which is secured in position by means of studs 210.

From the above description it will be seen that whenever it is desired or necessary to replace the valve element 58a, it is a comparatively easy matter to remove the cover plate 208, dislodge the pivot pin 206 from the bifurcated end of the operating shaft 66a and replace the valve element 58a or the valve assembly including the operating finger 64a, leaving the operating shaft 66a intact.

I claim as my invention:

In a valve construction, a casing having walls defining a valve chamber provided with a pair of valve ports, a substantially conical sealing surface surrounding each port, a valve operating rod extending through said casing from a point exteriorly of the chamber, said rod being mounted for oscillation in said casing about an axis equally removed from the axial center lines of said valve seats, a valve operating finger pivotally secured to the end of said operating rod within said valve chamber for free swinging movement about an axis transversely disposed relative to the operating rod, a substantially spherical valve member formed of resilient material rotatably and slidably disposed on the free end of said operating finger and selectively movable upon oscillation of said operating rod into sealing engagement with said valve seats, one of said casing walls being shaped to limit the outward axial movement of said valve member and to guide the latter into engagement with said valve seats upon oscillation of said operating rod, means exteriorly of said casting for oscillating said operating rod, and a removable cover plate for said valve chamber positioned to permit said operating finger to be swung away from said one of said casing walls for removal of said valve element from said operating finger.

References Cited in the file of this patent

UNITED STATES PATENTS

| Number | Name | Date |
|---|---|---|
| Re. 17,477 | Heald et al. | Nov. 5, 1929 |
| 498,545 | Gold | May 30, 1893 |
| 658,797 | Moeres | Oct. 2, 1900 |
| 710,184 | Clements | Sept. 30, 1902 |
| 719,569 | Couch | Feb. 3, 1903 |
| 752,439 | Coryell et al. | Feb. 16, 1904 |
| 1,664,983 | Kimmel | Apr. 3, 1928 |
| 1,715,574 | Skriba | June 4, 1929 |
| 1,905,825 | Egger et al. | Apr. 25, 1933 |
| 2,204,885 | Chamberlin | June 18, 1940 |
| 2,307,019 | Cebik | Jan. 5, 1943 |
| 2,364,418 | Barker | Dec. 5, 1944 |
| 2,365,105 | Perry | Dec. 12, 1944 |
| 2,368,120 | Downey | Jan. 30, 1945 |
| 2,384,225 | Wilson | Sept. 4, 1945 |
| 2,534,577 | Courtot | Dec. 19, 1950 |

FOREIGN PATENTS

| Number | Country | Date |
|---|---|---|
| 56,198 | Norway | of 1936 |